US011496619B2

(12) United States Patent
Zheng et al.

(10) Patent No.: US 11,496,619 B2
(45) Date of Patent: Nov. 8, 2022

(54) DATA PROCESSING METHOD, APPARATUS, AND TERMINAL DEVICE

(71) Applicant: HUAWEI TECHNOLOGIES CO., LTD., Guangdong (CN)

(72) Inventors: Delai Zheng, Shanghai (CN); Rui Ning, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 17/041,976

(22) PCT Filed: Mar. 27, 2018

(86) PCT No.: PCT/CN2018/080746
§ 371 (c)(1),
(2) Date: Sep. 25, 2020

(87) PCT Pub. No.: WO2019/183818
PCT Pub. Date: Oct. 3, 2019

(65) Prior Publication Data
US 2021/0029241 A1  Jan. 28, 2021

(51) Int. Cl.
*H04M 1/72463* (2021.01)
*H04W 8/22* (2009.01)
*H04W 92/08* (2009.01)

(52) U.S. Cl.
CPC ......... *H04M 1/72463* (2021.01); *H04W 8/22* (2013.01); *H04W 92/08* (2013.01)

(58) Field of Classification Search
CPC ......... H04M 1/72463; H04M 1/72448; H04M 1/72427; H04W 8/22; H04W 8/205; H04W 92/08; H04W 88/06; H04W 72/1242
See application file for complete search history.

(56) References Cited

U.S. PATENT DOCUMENTS 8,954,111 B2  2/2015  Geary et al.
9,332,107 B1  5/2016  Persson et al.
(Continued)

FOREIGN PATENT DOCUMENTS

CN  101521929 A  *  9/2009  ............ H04W 48/02
CN  101521929 A     9/2009
(Continued)

OTHER PUBLICATIONS

Office Action issued in Chinese Application No. 201880000816.0 dated Jan. 14, 2019, 8 pages.
Office Action issued in Chinese Application No. 201880000816.0 dated Aug. 1, 2019, 17 pages (with English translation).
(Continued)

*Primary Examiner* — Farid Seyedvosoghi
(74) *Attorney, Agent, or Firm* — Fish & Richardson P.C.

(57) ABSTRACT

Embodiments of this application provide methods, apparatuses, and terminal devices for managing communications services. In an implementation, a method comprises: identifying, by an input device of a terminal device, an operation performed on the terminal device for entering a service mode that prioritizes data services over voice services; sending, by a subscriber identification module (SIM) card of the terminal device, one or more instructions to a network server, wherein the one or more instructions instruct the network server to disable the voice services of the SIM card; and in response to identifying the operation, activating, by the SIM card, the service mode by disabling a function on the terminal device corresponding to the voice services.

20 Claims, 3 Drawing Sheets

(56) References Cited

U.S. PATENT DOCUMENTS

| | | | |
|---|---|---|---|
| 2004/0096062 A1* | 5/2004 | Oh | H04L 9/3271 380/270 |
| 2010/0195643 A1 | 8/2010 | Kodali et al. | |
| 2011/0217969 A1 | 9/2011 | Spartz et al. | |
| 2013/0215846 A1* | 8/2013 | Yerrabommanahalli | H04W 76/28 370/328 |
| 2017/0171902 A1* | 6/2017 | Tillman | H04W 76/15 |
| 2020/0389558 A1* | 12/2020 | Li | H04W 76/15 |

FOREIGN PATENT DOCUMENTS

| | | |
|---|---|---|
| CN | 102075630 A | 5/2011 |
| CN | 102792767 A | 11/2012 |
| CN | 103098535 A | 5/2013 |
| CN | 103139742 A | 6/2013 |
| CN | 104144260 A | 11/2014 |
| CN | 104350776 A | 2/2015 |
| CN | 105282302 A | 1/2016 |
| CN | 105450857 A | 3/2016 |
| CN | 105979501 A | 9/2016 |
| CN | 106375588 A | 2/2017 |
| CN | 106851010 A | 6/2017 |
| CN | 107690134 A | 2/2018 |

OTHER PUBLICATIONS

Office Action issued in Chinese Application No. 201880000816.0 dated Jan. 3, 2020, 15 pages (with English translation).

Office Action issued in Chinese Application No. 201880000816.0 dated May 7, 2020, 10 pages (with English translation).

PCT International Search Report and Written Opinion issued in International Application No. PCT/CN2018/080746 dated Jan. 4, 2019, 12 pages (partial English translation).

Extended European Search Report issued in European Application No. 18913014.9 dated Feb. 22, 2021, 8 pages.

Office Action issued in Chinese Application No. 202010710588.5 dated Feb. 19, 2021, 20 pages (with English translation).

\* cited by examiner

| General do-not-disturb | Primary SIM card | Incoming voice call of the primary SIM card | Short/multimedia message of the primary SIM card | Incoming voice call of a secondary SIM card | Short/multimedia message of the secondary SIM card | IM message such as a WeChat message |
|---|---|---|---|---|---|---|
| Single card | China Unicom/ China Mobile 4G | No box pops up | No box pops up | | | No box pops up |
| Single card | China Telecom 4G (SRLTE) | No box pops up (a data service is interrupted) | No box pops up (a data service is interrupted) | | | No box pops up |
| Dual cards | China Telecom 4G | No box pops up (a data service is interrupted) | No box pops up (a data service is interrupted) | A floating window is reduced in size and becomes semi-transparent, the incoming voice call is easily removed by a slide, vibration is reduced, and so on (a data service is interrupted) | No box pops up (a data service is interrupted) | No box pops up |
| Dual cards | China Unicom/ China Mobile 4G | No box pops up | No box pops up | A floating window is reduced in size and becomes semi-transparent, the incoming voice call is easily removed by a slide, vibration is reduced, and so on (a data service is interrupted) | No box pops up (a data service is interrupted) | No box pops up |

FIG. 1

DATA PROCESSING METHOD, APPARATUS, AND TERMINAL DEVICE

CROSS-REFERENCE TO RELATED APPLICATIONS

This application is a national stage of International Application No. PCT/CN2018/080746, filed on Mar. 27, 2018, which is hereby incorporated by reference in its entirety.

TECHNICAL FIELD

This application relates to the field of communications technologies, and in particular, to a data processing method, apparatus, and terminal device.

BACKGROUND

Telecommunications operators in China mainly include China Mobile, China Unicom, and China Telecom. Network types supported by China Mobile include LTE (Long Term Evolution) and GSM (Global System for Mobile Communications). Network types supported by China Unicom include LTE, UMTS (Universal Mobile Telecommunications System), and GSM. Network types supported by China Telecom include LTE, EVDO, and 1X. Voice services are still very important. In addition, existing mobile phones are generally in a dual-standby single-pass mode. To be specific, a primary SIM card is mainly used for data services, and a secondary SIM card is used for only voice and short message services. Because user equipment (for example, a smartphone) is only 1T, when one SIM card is on a call, the other SIM card cannot receive or send data. In other words, the user equipment cannot access a network.

Voice has a highest priority in existing mobile phone communication functions, but any voice or short message causes interference to a game to a different extent. For example, when a call is made by using the secondary SIM card, a data service of the primary SIM card is suspended. Consequently, game experience of a user is severely affected.

SUMMARY

Embodiments of this application provide a data processing method, apparatus, and terminal device, to resolve a problem in the prior art that user experience in a game is severely affected.

According to a first aspect, an embodiment of this application provides a data processing method, where the method is applied to a terminal device, the terminal device includes an input apparatus and a first SIM card, the first SIM card is configured to provide a data service for a user, and the method includes:

receiving, by the input apparatus, an operation that is entered by the user for entering a first scenario mode, where the first scenario mode is a mode in which a data service is preferred; sending, by the first SIM card, instruction information to a network server, where the instruction information is used to instruct the network server to disable a voice service of the first SIM card; disabling, by the first SIM card, a function corresponding to the voice service; and entering, by the first SIM card, the first scenario mode. Therefore, it is ensured that a data service running on the first SIM card is not interfered or interrupted.

In a possible implementation, the receiving, by the input apparatus, an operation that is entered by the user for entering a first scenario mode includes:
receiving, by the input apparatus from the user, an indication that a preset application program is running in a foreground; or receiving, by the input apparatus, tapping that is performed by the user on a key for enabling the first scenario mode.

In a possible implementation, the disabling, by the first SIM card, a function corresponding to the voice service includes:
when the first SIM card is a first type, setting the first SIM card to a mode in which a PS domain is kept enabled and a CS domain is disabled, or to a mode in which a 4G service is kept enabled, where the first type is a China Mobile SIM card or a China Unicom SIM card. When the China Mobile SIM card or the China Unicom SIM card enters the first scenario mode, the PS domain is kept enabled and the CS domain is disabled, or the 4G service is kept enabled, ensuring that no data service interference or interruption occurs when the user is in a data service experience process.

In a possible implementation, the disabling, by the first SIM card, a function corresponding to the voice service includes: when the first SIM card is a second type, setting the first SIM card to a mode in which 2G and 3G services are disabled and a 4G service is kept enabled, where the second type is a China Telecom SIM card. When the China Telecom SIM card enters the first scenario mode, the 2G and 3G services are disabled and only the 4G service is enabled, effectively preventing a network from falling back to 2G or 3G from 4G due to an external voice or short message occurring on the terminal device in this process, thereby improving user experience.

In a possible implementation, the terminal further includes a second SIM card, and the method further includes:
setting the second SIM card to a second scenario mode when a type of the terminal is DSDA; or disabling the second SIM card when a type of the terminal is DSDS; where
the second scenario mode is a message do-not-disturb mode. When the terminal carries two cards, the second SIM card is set to effectively avoid data service interference and interruption resulted from any voice or short message occurring on the second SIM card of the terminal device in this process.

In a possible implementation, the method further includes:
exiting, by the first SIM card of the terminal device, the first scenario mode when it is detected that the terminal device meets a condition for exiting the first scenario mode. When no data service experience is needed, the first SIM card exits the first scenario mode in a timely manner to avoid omission of an external voice or short message.

In a possible implementation, the meeting a condition for exiting the first scenario mode includes at least one of the following:
the running preset application program is running in a background of the terminal device or is disabled; or an operation that is entered by the user for exiting the first scenario mode is received.

According to a second aspect, an embodiment of this application provides a data processing apparatus, including:
an input module, configured to receive an operation that is entered by a user for entering a first scenario mode, where the first scenario mode is a mode in which a data service is preferred; a sending module, configured to send, by the first SIM card, instruction information to a network server, where the instruction information is used to instruct the network server to disable a voice service of the first SIM card, where the first SIM card is configured to provide a data service for the user; and a control module, configured to: control the first SIM card to disable a function corresponding to the voice service, and control the first SIM card to enter the first scenario mode.

In a possible implementation, the input module is configured to: receive, by the input apparatus from the user, an indication that a preset application program is running in a foreground; or receive, by the input apparatus, tapping that is performed by the user on a key for enabling the first scenario mode.

In a possible implementation, the control module is configured to: when the first SIM card is a first type, set the first SIM card to a mode in which a PS domain is kept enabled and a CS domain is disabled, or to a mode in which a 4G service is kept enabled, where the first type is a China Mobile SIM card or a China Unicom SIM card.

In a possible implementation, the control module is configured to: when the first SIM card is a second type, set the first SIM card to a mode in which 2G and 3G services are disabled and a 4G service is kept enabled, where the second type is a China Telecom SIM card.

In a possible implementation, the data processing apparatus further includes a second SIM card, and the control module is further configured to:

set the second SIM card to a second scenario mode when a type of the terminal is DSDA; or disable the second SIM card when a type of the terminal is DSDS; where the second scenario mode is a message do-not-disturb mode.

In a possible implementation, the control module is further configured to control the first SIM card of a terminal device to exit the first scenario mode when it is detected that the terminal device meets a condition for exiting the first scenario mode.

In a possible implementation, the meeting a condition for exiting the first scenario mode includes at least one of the following:

the running preset application program is running in a background of the terminal device or is disabled; or an operation that is entered by the user for exiting the first scenario mode is received.

According to a third aspect, an embodiment of this application provides a terminal device, including:

a transceiver, configured to receive an operation that is entered by a user for entering a first scenario mode, where the first scenario mode is a mode in which a data service is preferred, and the transceiver is further configured to send, by the first SIM card, instruction information to a network server, where the instruction information is used to instruct the network server to disable a voice service of the first SIM card, where the first SIM card is configured to provide a data service for the user; and a processor, configured to: control the first SIM card to disable a function corresponding to the voice service, and control the first SIM card to enter the first scenario mode.

In a possible implementation, the processor is configured to: receive, by the input terminal device from the user, an indication that a preset application program is running in a foreground; or receive, by the input terminal device, tapping that is performed by the user on a key for enabling the first scenario mode.

In a possible implementation, the processor is configured to: determine whether the terminal device carries two cards, and determine a type of the first SIM card; and when the first SIM card is a first type, set the first SIM card to a mode in which a PS domain is kept enabled and a CS domain is disabled, or to a mode in which a 4G service is kept enabled, where the first type is a China Mobile SIM card or a China Unicom SIM card.

In a possible implementation, the processor is configured to: when the first SIM card is a second type, set the first SIM card to a mode in which 2G and 3G services are disabled and a 4G service is kept enabled, where the second type is a China Telecom SIM card.

In a possible implementation, the terminal further includes a second SIM card, and the processor is further configured to:

set the second SIM card to a second scenario mode when a type of the terminal is DSDA; or disable the second SIM card when a type of the terminal is DSDS; where the second scenario mode is a message do-not-disturb mode.

In a possible implementation, the processor is further configured to control the first SIM card of the terminal device to exit the first scenario mode when it is detected that the terminal device meets a condition for exiting the first scenario mode.

In a possible implementation, the meeting a condition for exiting the first scenario mode includes at least one of the following:

the running preset application program is running in a background of the terminal device or is disabled; or an operation that is entered by the user for exiting the first scenario mode is received.

According to a fourth aspect, an embodiment of this application provides a computer program product that includes an instruction. When the instruction runs on a computer, the computer performs the method according to the first aspect.

According to a fifth aspect, an embodiment of this application provides a computer readable storage medium, where the computer readable storage medium stores a computer program, and the computer program is executed by a processor to implement the method according to the first aspect.

In the embodiments of this application, the operation that is entered by the user for entering the first scenario mode is received, where the first scenario mode is a mode in which a data service is preferred; the first SIM card sends the instruction information to the network server, where the instruction information is used to instruct the network server to disable the voice service of the first SIM card; the first SIM card disables the function corresponding to the voice service; and the first SIM card enters the first scenario mode. Therefore, it is ensured that a running data service is not interfered or interrupted.

BRIEF DESCRIPTION OF DRAWINGS

FIG. 1 is a table of data interference or interruption that exists in a scenario mode solution for preventing data network use from being interrupted by an incoming voice call in the prior art;

DESCRIPTION OF EMBODIMENTS

Figure 2:
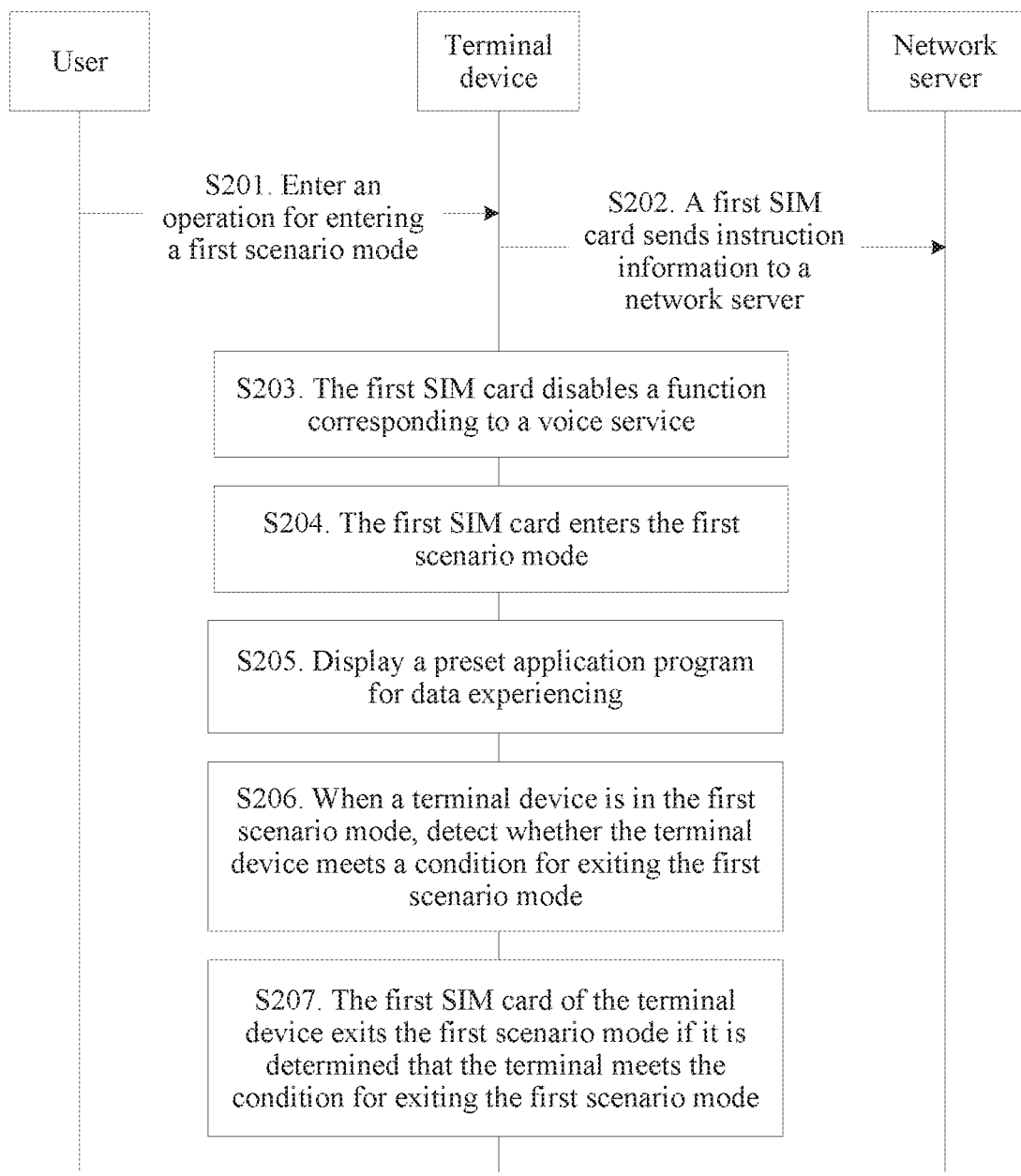
FIG. 2 is a schematic diagram of signaling interaction of a data processing method according to an embodiment of this application.

To make the objectives, technical solutions, and advantages of the embodiments of this application clearer, the following clearly describes the technical solutions in the embodiments of this application with reference to the embodiments and the accompanying drawings in the embodiments of this application.

The following technical solution is usually used in an existing scenario mode for preventing data network use from being interrupted by an incoming voice call: When detecting incoming voice call access in a process of a data network transmission service, a terminal detects a network connection type currently used by the terminal. If the network connection type currently used by the terminal is a wireless network connection, the terminal in this scenario mode disconnects the incoming voice call in a background, makes a response according to a voice interruption execution policy preset by a user, and prompts missed call information after this scenario mode is canceled. If the network connection type currently used by the terminal is a SIM card operator network connection, the terminal determines whether the terminal supports a service of simultaneously performing a voice service and a data network transmission service. If the terminal supports the service, the terminal in this scenario mode disconnects the incoming voice call in a background, makes a response according to a voice interruption execution policy preset by a user, and prompts missed call information after this scenario mode is canceled. If the terminal does not support the service, the terminal directly disables the voice service and preferably maintains the data network transmission service.

If the terminal carries a China Telecom SIM (Subscriber Identification Module, subscriber identity module) card, a mobile phone is in an SRLTE mode, namely, single ratio LTE. SRLTE means that two modes share one radio frequency device. If the device needs to listen to a voice or short message, a data service is periodically interrupted by CDMA2000 paging sensing. In addition, CDMA2000 periodic registration also interrupts the data service. In this case, the data service is interrupted. Android mobile phones generally support dual SIM single standby, to be specific, two SIM cards share one radio frequency device. However, a voice service has a high priority, and an incoming call and a received short message of a secondary SIM card still interrupt a data service. When a data service is not concurrent with a voice service, a network KPI (Key Performance Indicators) indicator is affected if an incoming voice call is hung up only in a background of the terminal. For example, some operators perform a data service in 4G and a CS (Circuit Switched, circuit switched) domain call in 2G If paging sensed in 4G is determined as CS domain paging, this paging is rejected in a 4G network to avoid falling back to 2G Consequently, the network cannot recognize that the user actively hangs up the call, and the network considers that the terminal is abnormal. To avoid deterioration of the network KPI, this call needs to be rejected in a 2G network. In this case, a data network service is interrupted. For details, refer to FIG. 1.

To resolve the foregoing technical problems, in the embodiments of this application, network negotiation is performed, a plurality of scenario modes are obtained through division, and a user performs selection on the plurality of scenario modes, to ensure that the user can experience a data service without interference and interruption caused by an external voice or message. This method is applicable to a terminal device such as a smartphone. The smartphone may be but is not limited to a single card smartphone or a dual card smartphone. Data service experience may be but is not limited to game experience (for example, Arena of Valor). The terminal device carries a SIM (Subscriber Identification Module, subscriber identity module) card.

It should be noted that in the following described embodiments, "first SIM card" and "second SIM card" are SIM cards; "first", "second", "third", and "fourth" in "first scenario mode", "second scenario mode", "third scenario mode", "fourth scenario mode", "first type", "second type", "first duration threshold", and "second duration threshold" are used to distinguish between scenario modes, types of SIM cards, and duration thresholds, and constitute no limitation on a scenario mode, a type of a SIM card, and a duration threshold.

FIG. 2 is a schematic flowchart of a data processing method according to an embodiment of this application. As shown in FIG. 2, the method is applied to a terminal device, and the terminal device includes an input apparatus and a first SIM card. The first SIM card is configured to provide a data service for a user, and the method specifically includes the following steps.

S201. The input apparatus receives an operation that is entered by the user for entering a first scenario mode.

S202. The first SIM card sends instruction information to a network server.

The input apparatus of the terminal device receives the operation that is entered by the user for entering the first scenario mode, and the first SIM card sends the instruction information to the network server. The first scenario mode is a mode in which a data service is preferred. In other words, after the terminal enters the first scenario mode, the terminal device displays a preset application program and shields an external message (for example, a call or a short message), to prevent running of the preset application program from being interrupted or interfered by the external message. The network server may be a server of a network operator corresponding to the first SIM card, and the instruction information is used to instruct the network server to disable a voice service of the first SIM card.

The preset application program may be set by the user, and the terminal may provide the user with an entry for entering the preset application program. For example, a game assistant may be used to set the preset application program, and a game is selected from a game assistant list by using the game assistant. Alternatively, an option or a key of the first scenario mode may be set in a state shortcut bar or a control bar of the terminal device, an application program APP set by the terminal, or an individual application APP. The terminal device is set to the first scenario mode by performing an operation such as tapping, sliding, or selection on the option or the key.

Specifically, that the input apparatus receives an operation that is entered by the user for entering a first scenario mode may be but is not limited to: the input apparatus receives, from the user, an indication that a preset application program is running in a foreground, or the input apparatus receives tapping that is performed by the user on a key for enabling the first scenario mode. For example, when the terminal device detects that a preset application program corresponding to the data service is running in the foreground, for example, the game Arena of Valor is running in a foreground of a smartphone, the terminal device may enter the first scenario mode. For another example, when the user taps on the option of the first scenario mode on the control bar of the terminal device, the terminal device may enter the first scenario mode.

It should be noted that when the terminal device determines that the terminal device needs to enter the first scenario mode, the terminal device may negotiate with the network server in an active reporting manner. In other words, the terminal device reports a configuration of a SIM card on the terminal device to the network server in a joint capability registration manner, and notifies the configuration of the SIM card on the terminal device to the network server in a re-registration manner (that is, by sending a message to the network server), to complete negotiation between the terminal device and the network server. The joint capability registration manner may be as follows: The terminal device actively sends a notification message or a data packet to the network server, and adds the instruction information to the notification message or the data packet, where the instruction information is used to instruct the network server to disable the voice service of the first SIM card.

S203. The first SIM card disables a function corresponding to the voice service.

S204. The first SIM card enters the first scenario mode.

In this embodiment, before the first SIM card disables the function corresponding to the voice service, a type of the first SIM card may be further determined. In this embodiment, types of SIM cards may include a China Mobile SIM card, a China Unicom SIM card, and a China Telecom SIM card.

When the terminal device carries a single card, and the single card (the first SIM card) is a first type, a network corresponding to the first SIM card is set to a mode in which a PS (Packet Switch) domain is kept enabled and a CS domain is disabled, or a network corresponding to a SIM card is set to a mode in which a 4G service is kept enabled. In this case, the terminal enters the first scenario mode, receives an operation triggered by the user to enter data service experience, and displays a corresponding data service.

The first type is a China Mobile SIM card or a China Unicom SIM card, and a network type supported by the first type includes GSM, 3G, and LTE.

When the terminal device carries a single card and the single card (the first SIM card) is a second type, a network corresponding to the SIM card is set to a mode in which 2G and 3G services are disabled and a 4G service is kept enabled, so that the terminal device enters the first scenario mode. The second type is a China Telecom SIM card, and a network type supported by the second type includes 1X, EVDO and LTE.

After the first SIM card enters the first scenario mode, when another terminal device initiates a voice call or message to the first SIM card, the first SIM card cannot receive the voice call or message because of the priority of the data service. For example, when a terminal device A entering the first scenario mode is used to play a game, and a terminal device B makes a call to the terminal device A, the terminal device B shows that the terminal device A is powered off or cannot be connected.

When it is detected that the terminal device carries two cards, configurations of the two cards (the first SIM card and a second SIM card) are specifically as follows:

When the terminal carries two cards, a SIM card configured to provide the data service for the user is the first SIM card. When the first SIM card is a first type, a network corresponding to the first SIM card is set to a mode in which a PS domain is kept enabled and a CS domain is disabled, or a network corresponding to the first SIM card is set to a mode in which a 4G service is kept enabled, so that the terminal device enters the first scenario mode. When the first SIM card is a second type, a network corresponding to the first SIM card is set to a mode in which 2G and 3G services are disabled and a 4G service is kept enabled. The second SIM card is set based on a type of the terminal device.

Setting the second SIM card based on the type of the terminal device specifically includes:
  setting the second SIM card to a second scenario mode when the type of the terminal is DSDA (Dual SIM Dual Active, dual SIM dual active); or disabling the second SIM card when the type of the terminal is DSDS (Dual SIM Dual Standby, dual SIM dual standby).

The second scenario mode is a message do-not-disturb mode (to be specific, no notification is sent when the second SIM card currently receives a message such as a call or a short message. For example, when a terminal device A entering the first scenario mode is used to play a game, and a terminal device B makes a call to a second SIM card of the terminal device A, the terminal device B shows that the second SIM card of the terminal device A can be connected but there is no answer). Disabling the second SIM card may be prohibiting reception and transmission of data of the second SIM card.

In this embodiment of this application, the foregoing solution is a case in which the user performs data service experience in a traffic manner. In this case, the terminal device is not connected to an external wireless network. For example, the user experiences a game by using 4G network traffic of the terminal device when the smartphone has no WiFi connection.

S205. Display a preset application program for data experiencing.

S206. When the terminal device is in the first scenario mode, detect whether the terminal device meets a condition for exiting the first scenario mode.

S207. The first SIM card of the terminal device exits the first scenario mode if it is determined that the terminal meets the condition for exiting the first scenario mode.

If it is detected that the terminal does not meet the condition for exiting the first scenario mode, the data service continues to be displayed in the foreground of the terminal device. If it is detected that the terminal meets the condition for exiting the first scenario mode, the first SIM card of the terminal device exits the first scenario mode. In this case, if the terminal device carries two cards, a current status of the second SIM card further needs to be set.

The meeting a condition for exiting the first scenario mode includes at least one of the following:
  the running preset application program is running in a background of the terminal device or is disabled; or
  an operation that is entered by the user for exiting the first scenario mode is received.

For example, the terminal device carries a single card. When it is detected that the running preset application program enters the background of the terminal device (for example, the game Arena of Valor exists a current interface of the terminal and enters the background), the first SIM card of the terminal device exits the first scenario mode; when it is detected that the running preset application program is in a screen-off state (for example, the game Arena of Valor is in a screen-off state), the first SIM card of the terminal device exits the first scenario mode; when it is detected that the running preset application program is in a running end state (for example, running of the game Arena of Valor ends), the first SIM card of the terminal device exits the first scenario mode; or the terminal device exits the first scenario mode when receiving the operation that is entered by the user for exiting the first scenario mode.

When the terminal carries two cards, a configuration of the first SIM card is specifically as follows: When it is detected that the running preset application program enters the background of the terminal device, the first SIM card of the terminal device exits the first scenario mode; when it is detected that the running preset application program is in a screen-off state, the first SIM card of the terminal device exits the first scenario mode; when it is detected that the running preset application program is in a running end state, the first SIM card of the terminal device exits the first scenario mode; the terminal device exits the first scenario mode when receiving the operation that is entered by the user for exiting the first scenario mode; or when it is detected that the preset application program is running in the background of the terminal device for a time exceeding a specified first duration threshold, the first SIM card of the terminal device exits the first scenario mode.

That the second SIM card of the terminal device of a DSDA type exits the second scenario mode is specifically as follows: When it is detected that the running preset application program stays in a screen-off state for a time exceeding a specified first duration threshold, the second SIM card of the terminal device exits the second scenario mode; and when it is detected that the running preset application program is in a running end state, the second SIM card of the terminal device exits the second scenario mode; or the second SIM card of the terminal device exits the second scenario mode when the operation that is entered by the user for exiting the first scenario mode is received. When the second SIM card exits the second scenario mode, the second SIM card may report a configuration of the second SIM card to the network server in a joint capability registration manner, to perform re-registration to obtain a corresponding function of keeping enabling a 4G service.

That the terminal device of a DSDS type re-enables the second SIM card is specifically as follows: When it is detected that the running preset application program is in a screen-off state for a time exceeding the specified first duration threshold, the second SIM card of the terminal device is re-enabled; when it is detected that the running preset application program is in a running end state, the second SIM card of the terminal device is re-enabled; or the second SIM card of the terminal device is re-enabled when the operation that is entered by the user for exiting the first scenario mode is received. Before the second SIM card is re-enabled, the second SIM card may report a configuration of the second SIM card to the network server in a joint capability registration manner, to perform re-registration to obtain a corresponding function of keeping enabling the second SIM card.

It should be noted that when the type of the first SIM card is the second type (namely, a China Telecom SIM card), the first SIM card of the terminal device exits the first scenario mode when it is detected that the terminal device meets the condition for exiting the first scenario mode and a second duration threshold is exceeded. In other words, when the first SIM card is a China Telecom SIM card, the China Telecom SIM card restores 2G and 3G services after it is detected that the terminal device meets the condition for exiting the first scenario mode and the second duration threshold is exceeded.

The first duration threshold may be 30 s, 60 s, 90 s, or the like, and the second duration threshold may be 30 s, 60 s, 90 s, or the like. The first duration threshold and the second duration threshold may be set to be the same or different. The first duration threshold and the second duration threshold may be set based on an actual requirement. This is not specifically limited in this embodiment.

In this embodiment of this application, the operation that is entered by the user for entering the first scenario mode is received, where the first scenario mode is a mode in which a data service is preferred; the first SIM card sends the instruction information to the network server, where the instruction information is used to instruct the network server to disable the voice service of the first SIM card; the first SIM card disables the function corresponding to the voice service; and the first SIM card enters the first scenario mode. Therefore, user experience in a data service experience process is ensured.

Figure 3:
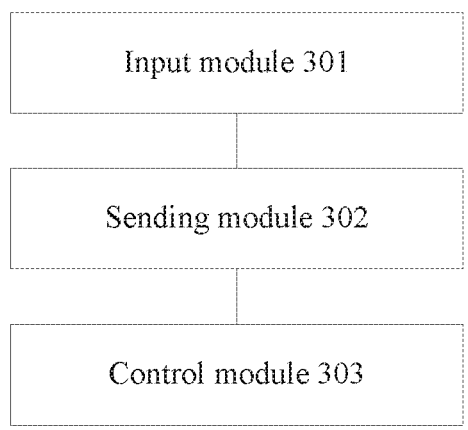
FIG. 3 is a schematic structural diagram of a data processing apparatus according to an embodiment of this application.

FIG. 3 is a schematic structural diagram of a data processing apparatus according to an embodiment of this application. As shown in FIG. 3, the data processing apparatus is applied to a terminal device, and the data processing apparatus includes an input module and a first SIM card. The first SIM card is configured to provide a data service for a user, and the apparatus specifically includes:

an input module 301, configured to receive an operation that is entered by the user for entering a first scenario mode, where the first scenario mode is a mode in which a data service is preferred;

a sending module 302, configured to send, by the first SIM card, instruction information to a network server, where the instruction information is used to instruct the network server to disable a voice service of the first SIM card; and a control module 303, configured to: control the first SIM card to disable a function corresponding to the voice service, and control the first SIM card to enter the first scenario mode.

Optionally, the input module 301 is configured to: receive, by the input apparatus from the user, an indication that a preset application program is running in a foreground, or receive, by the input apparatus, tapping that is performed by the user on a key for enabling the first scenario mode.

Optionally, the control module 303 is configured to: determine whether the terminal device carries two cards, and determine a type of the first SIM card; and when the first SIM card is a first type, set the first SIM card to a mode in which a PS domain is kept enabled and a CS domain is disabled, or to a mode in which a 4G service is kept enabled, where the first type is a China Mobile SIM card or a China Unicom SIM card.

Optionally, the control module 303 is configured to: when the first SIM card is a second type, set the first SIM card to a mode in which 2G and 3G services are disabled and a 4G service is kept enabled, where the second type is a China Telecom SIM card.

Optionally, the data processing apparatus further includes a second SIM card, and the control module 303 is further configured to:

set the second SIM card to a second scenario mode when a type of the terminal is DSDA; or disable the second SIM card when a type of the terminal is DSDS; where the second scenario mode is a message do-not-disturb mode.

Optionally, the control module 303 is further configured to control the first SIM card of the terminal device to exit the first scenario mode when it is detected that the terminal device meets a condition for exiting the first scenario mode.

Optionally, the meeting a condition for exiting the first scenario mode includes at least one of the following:

the running preset application program is running in a background of the terminal device or is disabled; or an operation that is entered by the user for exiting the first scenario mode is received.

The data processing apparatus in this embodiment may be used to perform the data processing method shown in FIG. 2, and may perform each step in the method shown in FIG. 2 to implement a technical effect of the data processing method. For brevity, details are not described herein again.

Figure 4:
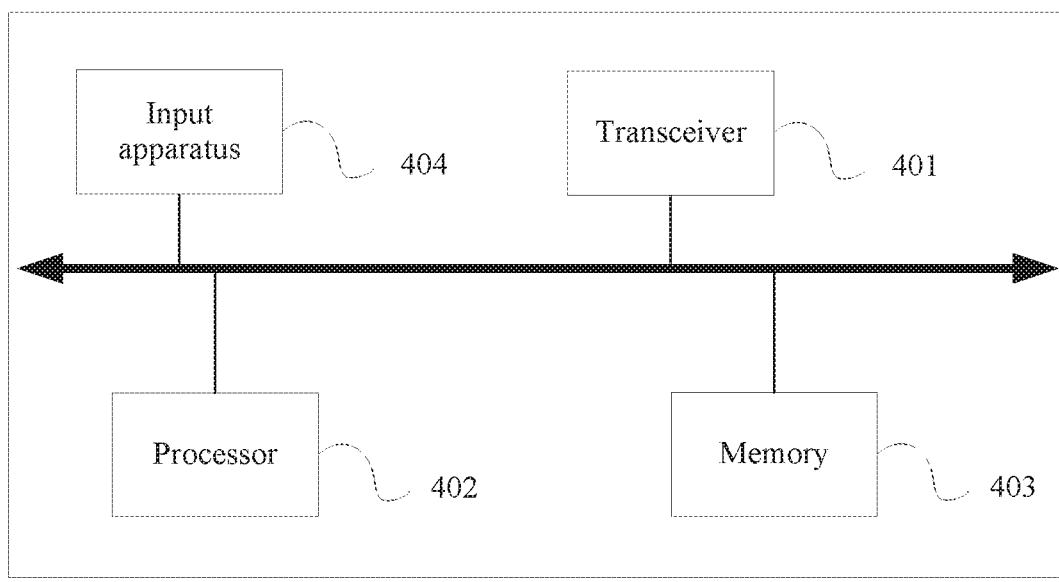
FIG. 4 is a schematic structural diagram of a terminal device according to an embodiment of this application.

FIG. 4 is a schematic structural diagram of a terminal device according to an embodiment of this application. As shown in FIG. 4, the terminal device specifically includes a transceiver 401, a processor 402, a memory 403, and an input apparatus 404.

The transceiver 401 may be an antenna.

The processor 402 may be a central processing unit (CPU), or a combination of a CPU and a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 403 is configured to store various applications, operating systems, and data. The memory 403 may transmit the stored data to the processor 402. The memory 403 may include a volatile memory such as a nonvolatile random access memory (NVRAM), a phase change random access memory (phase change RAM, PRAM), or a magnetoresistive random access memory (magnetoresistive RAM, MRAM), or may include a nonvolatile memory such as at least one magnetic disk storage device, an electrically erasable programmable read-only memory (EEPROM), a flash memory device such as a NOR flash memory or a NAND flash memory, a semiconductor such as a solid state disk (SSD), or the like. Alternatively, the memory 403 may include a combination of the foregoing types of memories.

The input apparatus 404 may be a display panel.

It may be understood that the memory 403 may be integrated into the processor 402, or may exist independently.

Operation processes of the components are as follows:

The input apparatus 404 is configured to receive an operation that is entered by a user for entering a first scenario mode, where the first scenario mode is a mode in which a data service is preferred.

The transceiver 401 is configured to send, by the first SIM card, instruction information to a network server, where the instruction information is used to instruct the network server to disable a voice service of the first SIM card.

The processor 402 is configured to: control the first SIM card to disable a function corresponding to the voice service, and control the first SIM card to enter the first scenario mode.

Optionally, the transceiver 401 is configured to: receive, by the input apparatus from the user, an indication that a preset application program is running in a foreground, or receive, by the input apparatus, tapping that is performed by the user on a key for enabling the first scenario mode.

Optionally, the processor 402 is configured to: determine whether the terminal device carries two cards, and determine a type of the first SIM card; and when the first SIM card is a first type, set the first SIM card to a mode in which a PS domain is kept enabled and a CS domain is disabled, or to a mode in which a 4G service is kept enabled, where the first type is a China Mobile SIM card or a China Unicom SIM card.

Optionally, the processor 402 is configured to: when the first SIM card is a second type, set the first SIM card to a mode in which 2G and 3G services are disabled and a 4G service is kept enabled, where the second type is a China Telecom SIM card.

Optionally, the terminal device further includes a second SIM card, and the processor 402 is further configured to:

set the second SIM card to a second scenario mode when a type of the terminal is DSDA; or disable the second SIM card when a type of the terminal is DSDS; where the second scenario mode is a message do-not-disturb mode.

Optionally, the processor 402 is further configured to control the first SIM card of the terminal device to exit the first scenario mode when it is detected that the terminal device meets a condition for exiting the first scenario mode.

Optionally, the meeting a condition for exiting the first scenario mode includes at least one of the following:

the running preset application program is running in a background of the terminal device or is disabled; or an operation that is entered by the user for exiting the first scenario mode is received.

The terminal device in this embodiment may be used to perform the data processing method shown in FIG. 2, and may perform each step in the method shown in FIG. 2 to implement a technical effect of the data processing method. For brevity of description, details are not described herein again.

A person skilled in the art may be further aware that, in combination with the examples described in the embodiments disclosed in this specification, units and steps may be implemented by electronic hardware, computer software, or a combination thereof. To clearly describe interchangeability between the hardware and the software, compositions and steps of each example have generally been described in the foregoing specification based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the integrated unit is implemented in the form of a software functional unit and sold or used as an independent product, the integrated unit may be stored in a computer readable storage medium. Based on such an understanding, all of the technical solutions of this application or the part of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for managing communication services, the method comprising:
    identifying, by a terminal device, an operation performed on the terminal device for entering a service mode that prioritizes data services over voice services; and
    in response to identifying the operation, sending, by the terminal device to a network server, one or more instructions that instruct the network server to disable the voice services of the terminal device.

2. The method according to claim 1, wherein the operation is a tapping or sliding gesture performed on a touchscreen of the terminal device to enable an option presented on a user interface of the touchscreen for enabling the service mode.

3. The method according to claim 1, wherein the operation is one or more tapping or sliding gestures performed on a touchscreen of the terminal device to select one or more applications presented on a user interface, and wherein an application of the selected one or more applications forces the service mode to be activated in response to the application running in a foreground of the user interface.

4. The method according to claim 3, further comprising:
    exiting, the terminal device, the service mode in response to detecting that a predetermined condition for exiting the service mode is satisfied.

5. The method according to claim 4, wherein the predetermined condition comprises one or more of:
    the one or more applications are switched to run in a background of a user interface of the terminal device;
    the one or more applications are exited from running; or
    an operation on the terminal device for exiting the service mode is performed.

6. The method according to claim 1, wherein the terminal device supports global system for mobile communications (GSM), 3G, and long-term evolution (LTE) standards, and disabling the voice services comprises:
    setting the terminal device to a mode that a packet switched (PS) domain is enabled and a circuit switched (CS) domain is disabled, or to a mode that a 4G service is enabled.

7. A terminal device, comprising:
    at least one processor; and
    a non-transitory computer-readable storage medium coupled to the at least one processor and storing programming instructions for execution by the at least one processor, the programming instructions instruct the terminal device to:
        identify an operation performed on the terminal device for entering a service mode that prioritizes data services over voice services; and
        in response to identifying the operation, send, by the terminal device to a network server, one or more instructions that instruct the network server to disable the voice services of the terminal device.

8. The terminal device according to claim 7, wherein the operation is a tapping or sliding gesture performed on a touchscreen of the terminal device to enable an option presented on a user interface of the touchscreen for enabling the service mode.

9. The terminal device according to claim 7, wherein the operation is one or more tapping or sliding gestures performed on a touchscreen of the terminal device to select one or more applications presented on a user interface, and wherein an application of the selected one or more applications forces the service mode to be activated in response to the application running in a foreground of the user interface.

10. The terminal device according to claim 9, the programming instructions further instruct the terminal device to:
    exit, by the terminal device, the service mode in response to detecting that a predetermined condition for exiting the service mode is satisfied.

11. The terminal device according to claim 10, wherein the predetermined condition comprises one or more of:
    the one or more applications are switched to run in a background of a user interface of the terminal device;
    the one or more applications are exited from running; or
    an operation on the terminal device for exiting the service mode is performed.

12. The terminal device according to claim 7, wherein the terminal device supports global system for mobile communications (GSM), 3G, and long-term evolution (LTE) standards, and the disabling the voice services comprises:
    setting the terminal device to a mode that a packet switched (PS) domain is enabled and a circuit switched (CS) domain is disabled, or to a mode that a 4G service is enabled.

13. A terminal device, comprising:
    at least one processor; and
    a non-transitory computer-readable storage medium coupled to the at least one processor and storing programming instructions for execution by the at least one processor, the programming instructions instruct the terminal device to:
        identify an operation performed on the terminal device for entering a service mode that prioritizes data services over voice services, wherein the terminal device is installed with a first subscriber identification model (SIM) card and a second SIM card, the terminal device supports dual SIM dual standby (DSDS), the first SIM card supports data services and voice services and the second SIM card supports voice services, and the data services of the first SIM card is disabled when the second SIM card performs the voice services; and
        in response to identifying the operation, sending, to a network server, one or more instructions that instruct the network server to disable the voice services of the terminal device.

14. The terminal device according to claim 13, wherein the operation is performed on a user interface of the terminal device to enable an option presented on the user interface of the terminal device for enabling the service mode.

15. The terminal device according to claim 14, wherein the user interface is a user interface of an application running in a foreground of the user interface.

16. The terminal device according to claim 13, wherein the voice services supported by the first SIM card and the second SIM comprise text services, the data services supported by the first SIM card are 4G services.

17. The terminal device according to claim 13, wherein the operation is one or more tapping or sliding gestures performed on a touchscreen of the terminal device.

18. The terminal device according to claim 13, the programming instructions further instruct the terminal device to:

send one or more instructions to a network server, wherein the one or more instructions instruct the network server to disable the voice services of the first SIM card and the second SIM card, wherein disabling the voice services of the second SIM card unregisters the second SIM card from the network server.

19. The terminal device according to claim 18, the programming instructions further instruct the terminal device to:

exit the service mode in response to detecting that an operation on the terminal device for exiting the service mode is performed;

enable voice services supported by the first SIM card; and re-register the second SIM card to a network server.

20. The terminal device according to claim 13, wherein disabling the voice services of the first SIM card comprises:

setting the first SIM card to a mode that a packet switched (PS) domain is enabled and a circuit switched (CS) domain is disabled, or to a mode that 4G services are enabled.

\* \* \* \* \*